United States Patent
Miyata

(10) Patent No.: US 8,965,448 B2
(45) Date of Patent: Feb. 24, 2015

(54) MULTIMODE ACCESS CONTROL METHOD AND MULTIMODE MOBILE STATION

(75) Inventor: Katsuya Miyata, Yokohama (JP)

(73) Assignee: Lenovo Innovations Limited (Hong Kong), Hong Kong (CN)

(*) Notice: Subject to any disclaimer, the term of this patent is extended or adjusted under 35 U.S.C. 154(b) by 1663 days.

(21) Appl. No.: 11/359,893

(22) Filed: Feb. 17, 2006

(65) Prior Publication Data

US 2006/0189336 A1 Aug. 24, 2006

(30) Foreign Application Priority Data

Feb. 21, 2005 (JP) ................................. 2005-043699

(51) Int. Cl.
| H04M 1/00 | (2006.01) |
| H04W 48/18 | (2009.01) |
| H04W 4/02 | (2009.01) |

(52) U.S. Cl.
CPC ............... *H04W 48/18* (2013.01); *H04W 4/02* (2013.01); *Y02B 60/50* (2013.01)
USPC ..................... 455/552.1; 455/432.1; 455/440; 455/436; 455/404.2

(58) Field of Classification Search
USPC ......... 455/552, 432.1, 552.1, 440, 436, 404.2
See application file for complete search history.

(56) References Cited

U.S. PATENT DOCUMENTS

| 6,567,035 B1* | 5/2003 | Elliott | ........................ 342/20 |
| 7,139,587 B2* | 11/2006 | Ishii | ........................ 455/552.1 |
| 2003/0003951 A1* | 1/2003 | Leprieur et al. | ........................ 455/552 |
| 2003/0129979 A1* | 7/2003 | Cooper | ........................ 455/432 |
| 2006/0084443 A1 | 4/2006 | Yeo et al. | |

FOREIGN PATENT DOCUMENTS

| CN | 101044783 | 9/2007 |
| JP | 07-087010 | 3/1995 |
| JP | 10304071 | 11/1998 |
| JP | 11234389 | 8/1999 |
| JP | 2000106692 | 4/2000 |
| JP | 2001119452 | 4/2001 |
| JP | 2002-223474 | 8/2002 |

(Continued)

OTHER PUBLICATIONS

Office Action dated Mar. 7, 2008 (Summary only in Chinese and the "Detailed Action" in Chinese together with an English translation) issued for the corresponding Chinese Patent Application No. 200610009403.8.

*Primary Examiner* — Patrick Edouard
*Assistant Examiner* — Chuck Huynh
(74) *Attorney, Agent, or Firm* — Cozen O'Connor

(57) ABSTRACT

In a multimode mobile station capable of communicating with a plurality of cellular systems where a current cellular system which the mobile station has acquired and a cellular system which the mobile station tries to access differ, access-failure information is stored at access failure time. The access-failure information includes any one of, or the combination of information on access failure such as access-system type, access time information, access location information, access failure reason, number of access failures, etc. Since an access cellular system is selected on the basis of the stored access-failure information, even when a current cellular system which the mobile station has acquired and a cellular system which the mobile station tries to access differ, it is possible to shorten re-acquisition time and to reduce power consumption.

18 Claims, 3 Drawing Sheets

(56) References Cited

FOREIGN PATENT DOCUMENTS

| | | |
|---|---|---|
| JP | 2003-153329 | 5/2003 |
| JP | 2003153325 | 5/2003 |
| JP | 2004-297480 | 10/2004 |
| JP | 2006-504286 | 2/2006 |
| WO | WO 03/061327 | 7/2003 |

* cited by examiner

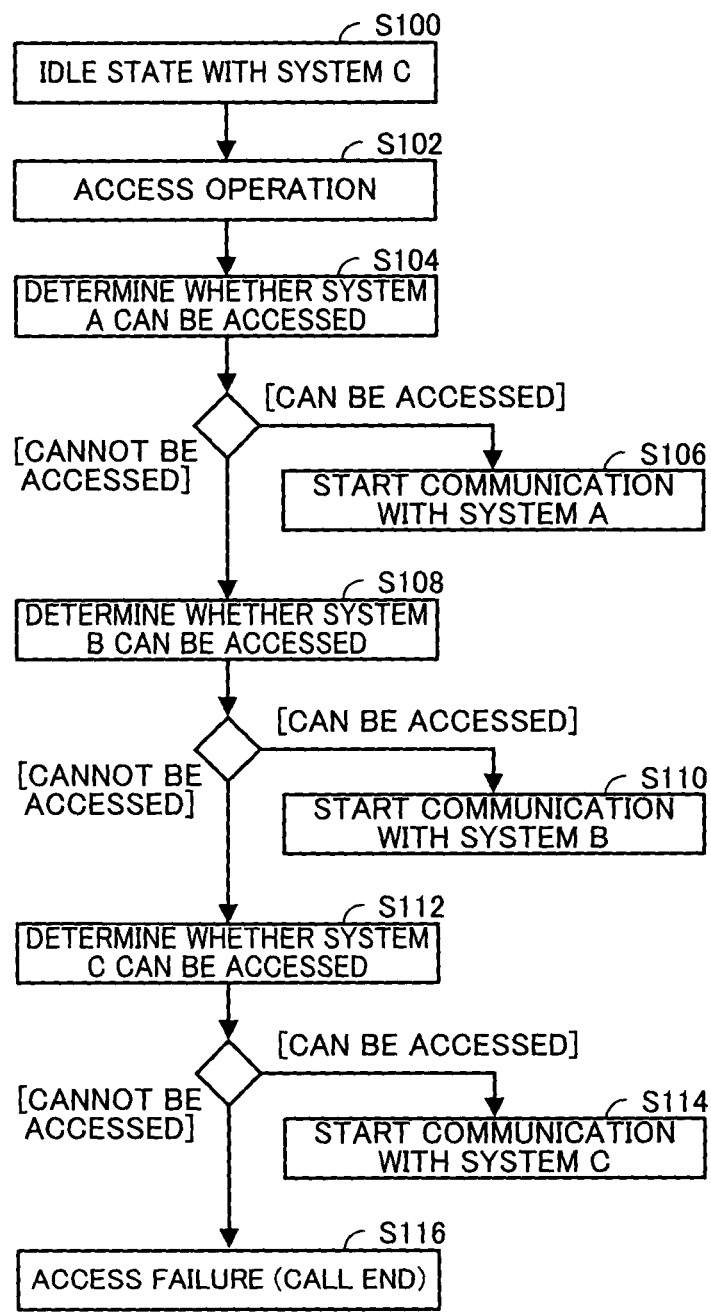

MULTIMODE ACCESS CONTROL METHOD AND MULTIMODE MOBILE STATION

CROSS-REFERENCE TO RELATED APPLICATION

This application is based upon and claims the benefit of priority from the prior Japanese Patent Application No. 2005-043699 filed Feb. 21, 2005, the entire contents of which is incorporated herein by reference.

BACKGROUND OF THE INVENTION

1. Field of the Invention

The present invention relates to a multimode access control method performed by a communication terminal capable of communicating with a plurality of cellular systems and a multimode mobile station using the multimode access control method.

2. Description of the Related Art

To date, a plurality of cellular systems, such as CDMA 2000 (Code Division Multiple Access 2000), EV-DO (Evolution-Data Only), W-CDMA (a European version of Wideband CDMA), etc., have been in practical use. Also, it is assumed that the same cellular system will be operated at different frequency bands, for example, an 800-MHz band, a 1.7-GHz band, a 2-GHz band, etc., in the future. Also, multimode mobile communication terminals capable of using such a plurality of cellular systems or a plurality of frequency bands have been developed.

When the power is turned on, a multimode mobile communication terminal performs the acquisition operation of the control signal transmitted by a base station of each system (including the cases of having different frequency bands within the same system) in the order based on the information of a preferred list which indicates available systems stored in that terminal in advance. When the synchronization is obtained, the terminal enters an idle state. Also, when the control signal of the system which the terminal has acquired so far is lost (system lost), or when maintaining the idle operation becomes difficult because of the deterioration of the radio wave environment or the like, the terminal performs the acquisition operation on the basis of the order based on the information of the preferred list which indicates available systems and enters an idle state of the system that has been re-acquired.

Techniques for changing the order of acquisition among a plurality of systems in accordance with the reception quality (RSSI and Ec/Io) at an idle time are known. For example, the following technique has been disclosed in Japanese Laid-Open (Kokai) Patent Application Publication No. 2003-153325. In the technique, when two systems, A and B have been registered in this order on a preferred list which indicates available systems and a system lost occurs in an idle state of system A, if the reception quality of system A is better than a certain condition, the probability of re-acquiring system A is high and the existence of system B is not sure. Thus, the acquisition operation is tried again in the order of A→B. On the other hand, if the reception quality of system A is worse than the certain condition, the probability of re-acquiring system A is low. Thus the acquisition operation of system A is not performed and the acquisition operation of system B is performed from the beginning in order to shorten re-acquisition time and to reduce power consumption.

However, the method disclosed in the above-described Japanese Laid-Open Patent Application Publication cannot be applied to the case where a current cellular system which the mobile station has acquired is different from a cellular system which the mobile station tries to access. A description will be given on this with reference to a known access sequence shown in FIG. 3. It is assumed that the multimode mobile communication terminal performing the access sequence shown in FIG. 3 can be used with three systems, A, B and C.

First, when an access operation is performed (S102) in an idle state with system C (S100), the acquisition operation of system A is performed (S104). Here, if system A is acquired, the communication with system A is started (S106). Whereas if it is not acquired, the processing proceeds to the acquisition operation of system B (S108). Here, if system B is acquired, the communication with system B is started (S110). Whereas if it is not acquired, the processing proceeds to the acquisition operation of system C (S112). Here, if system C is acquired, the communication with system C is started (S114). Whereas if it is not acquired, an access failure occurs and the processing proceeds to an idle state (S116).

In a multimode mobile communication terminal performing such an operation, for example, it becomes a waste of time and a waste of power consumption to perform the acquisition operation of system A in step S104 in an area out of the service range of system A. In this case, it is desirable to proceed to the acquisition operation of system B or system C without performing the acquisition operation of system A. However, since the reception quality of system C, which has been acquired, has no correlation with the acquisition easiness of system A or system B in general, a problem arises that advantages of shortening re-acquisition time and reducing power consumption cannot be obtained even if the acquisition order is changed in accordance with the reception quality at an idle time as in the known technique.

SUMMARY OF THE INVENTION

The present invention has been made in view of these circumstances and it is an object of the present invention to provide a multimode access control method and a multimode communication terminal which can shorten re-acquisition time and reduce power consumption when a current cellular system which the mobile station has acquired and a cellular system which the mobile station tries to access differ.

In order to achieve the above-described object, the present invention provides a multimode access control method capable of communicating with a plurality of cellular systems in a multimode mobile station where a current cellular system which the mobile station has acquired and a cellular system which the mobile station tries to access differ, comprising, a storing step for storing access-failure information at access failure time, and a selecting step for selecting an access cellular system based on the access-failure information is provided.

Also, in order to achieve the above-described object, the present invention provides a multimode mobile station capable of communicating with a plurality of cellular systems performing multimode mobile communication where a current cellular system which the mobile station has acquired and a cellular system which the mobile station tries to access differ, comprising: a storing means for storing access-failure information at access failure time; and a selecting means for selecting an access cellular system on the basis of the access-failure information is provided.

According to the present invention, since access-failure information is stored at access failure time and an access cellular system is selected on the basis of the stored access-failure information, even when a current cellular system which the mobile station has acquired and the cellular system which the mobile station tires to access differ, it is possible to shorten the re-acquisition time and to reduce power consumption.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a sequence chart illustrating an access sequence of a known example.

DETAILED DESCRIPTION OF THE PREFERRED EMBODIMENTS

Hereinafter, the preferred embodiments of the present invention will be described in detail with reference to the drawings.

A. Configuration

Figure 1:
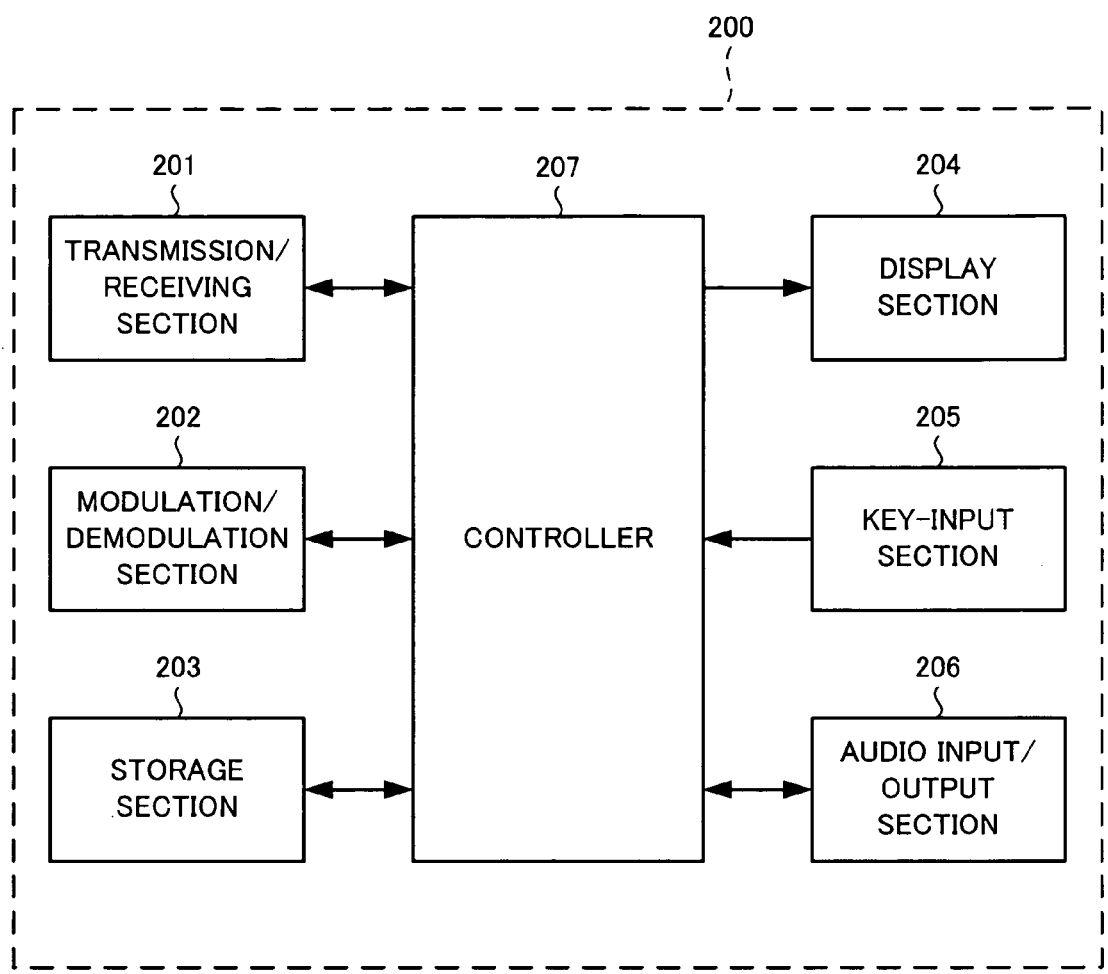
FIG. 1 is a block diagram illustrating the configuration of a mobile communication terminal according to an embodiment of the present invention.

FIG. 1 is a block diagram illustrating the configuration of a multimode communication terminal 200 according to an embodiment of the present invention. The multimode communication terminal 200 shown in the figure includes a transmission/receiving section 201, a modulation/demodulation section 202, a storage section 203, a display section 204, a key-input section 205, an audio input/output section 206, and a controller 207.

The transmission/receiving section 201 transmits and receives a radio signal. Also, the transmission/receiving section 201 can measure the receiving level of a received signal from a radio-signal base station, particularly, of a pilot signal. The modulation/demodulation section 202 modulates and demodulates data to be transmitted and received. In this regard, the transmission/receiving section 201 and the modulation/demodulation section 202 are capable of handling a plurality of communication methods or frequency bands. The storage section 203 stores programs, audio, video, mails, the web, other user data, etc., and may be a memory built in the communication terminal or may be an external memory such as a removable memory card, etc.

The display section 204 is a display screen such as a liquid-crystal display, etc., and displays mails, the web, a basic operation screen, etc. Also, the display section 204 may include a plurality of screens, such as a main screen, a sub-screen, etc. The key-input section 205 receives input from a user through a ten-key pad, function keys, a touch panel, audio input, etc. The audio input/output section 206 includes an audio-input section such as a microphone for converting input voice into a signal, etc., and an audio-output section such as a speaker for outputting voice.

The controller 207 controls the entire mobile communication terminal, that is to say, the transmission/receiving section 201, the modulation/demodulation section 202, the storage section 203, the display section 204, the key-input section 205, the audio input/output section 206, etc. For example, when the user performs voice operation through the key-input section 205, the controller 207 controls the transmission/receiving section 201 on the basis of the communication establishment processing program for voice communication stored in the storage section 203 in order to establish communication. When the communication is established, the controller 207 displays the establishment to the display section 204, controls the modulation/demodulation section 202 to modulate the voice signal input from the audio input/output section 206, and transmits the signal to the other party on the line through the transmission/receiving section 201. At the same time, the controller 207 controls the modulation/demodulation section 202 to demodulate the voice data received through the transmission/receiving section 201 in order to output the data as the voice signal from the audio input/output section 206.

B. Operation

Next, a description will be given of the operation of the mobile terminal 200 having the above-described configuration with reference to FIG. 2.

Figure 2:
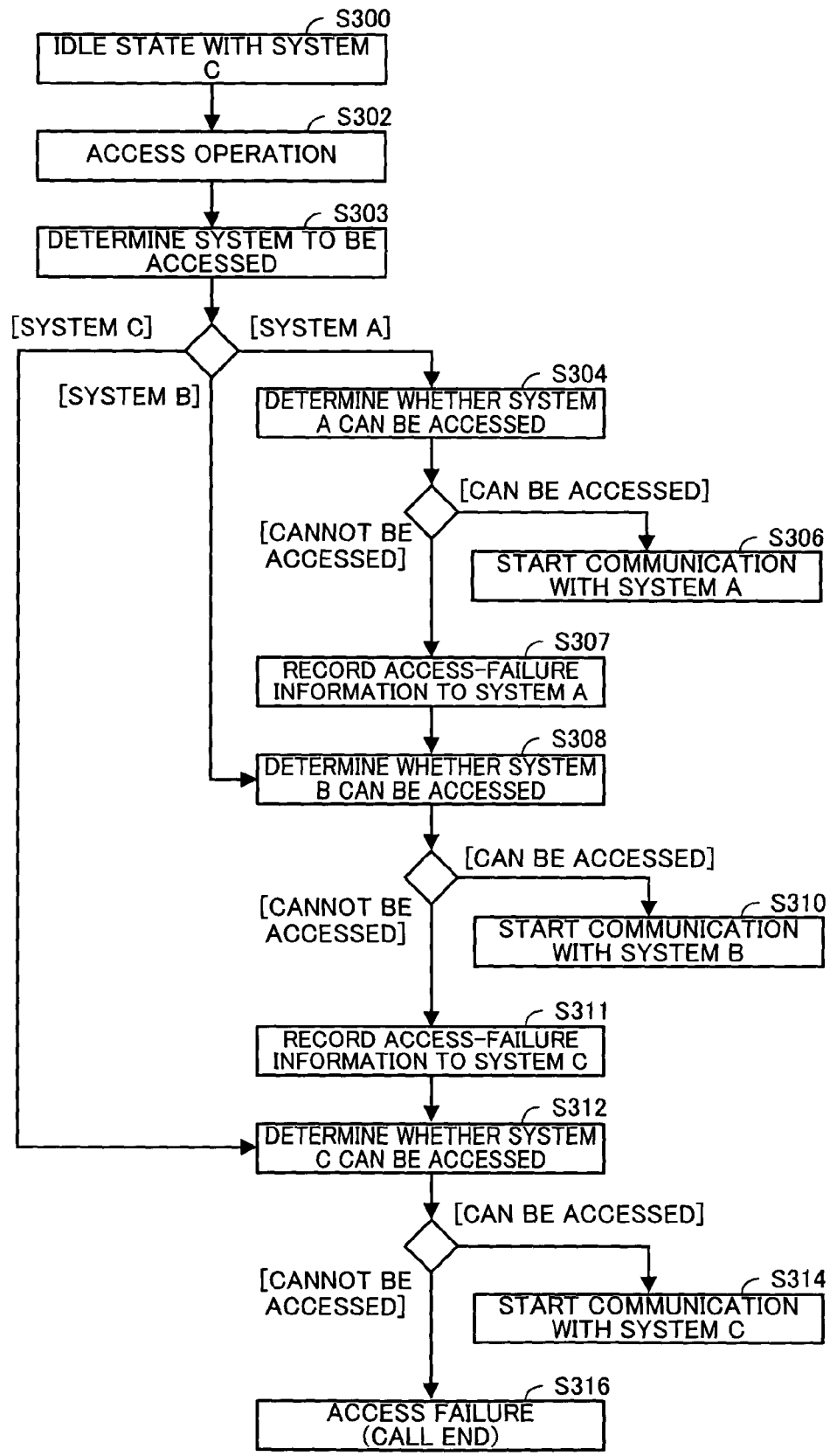
FIG. 2 is a sequence chart illustrating an access sequence of the mobile communication terminal according to the embodiment.

FIG. 2 is a sequence chart illustrating an access sequence of the mobile communication terminal 200. In this regard, the mobile terminal 200 to be the main body of the operation is assumed to be capable of using three different cellular systems A, B and C. However, this is only an example and available cellular systems, even if not three but a plurality, will not be given any attention. Also, cellular systems mentioned here include the cases of different methods, such as CDMA 2000, EV-DO, W-CDMA, and a wireless LAN, and the cases of different frequency bands even if using the same method. In this regard, in this explanation of the operation, an example is taken of the case where the cellular system C is normal, however the example of a failure is omitted in order to avoid being complex concerning the explanation of this embodiment.

First, when an access operation is performed (S302) in an idle state with system C (S300), determination processing of the cellular system to be accessed first is performed (S303). The details on this will be described below. The determination is made on the basis of the information recorded at an access failure time. Accordingly, if there is no record of the access failure, such as at the first access time, etc., it is determined to access cellular system A in S303. Otherwise, concerning the same case (that is no record of the access failure) the determination is not made. In either case, the processing proceeds to S304. This is because when there is no record of the access failure at the first access time, the terminal may be set such that cellular system A is accessed or such that the determination processing is not performed at all. Thus, the processing proceeds to S304 in both of the cases.

In S304, a determination is made on whether cellular system A can be accessed. The following methods are possible as determination methods. A method for performing an acquisition operation of cellular system A and determining cellular system A as accessible when acquisition is acquired and determining cellular system A as inaccessible when acquisition is not acquired. There is also a method for issuing an access request to cellular system A and determining cellular system A as accessible when there is an response of normal completion within a predetermined time and determining cellular system A as inaccessible when there is no response within a predetermined time or when a response received indicating abnormal completion such as inaccessibility, etc. Here, if it is determined to be accessible, the communication with cellular system A is started (S306). On the other hand, if it is determined to be inaccessible, the access-failure information to cellular system A is stored in the storage section 203 (S307).

The access-failure information mentioned here includes any one of or the combination of access-failure information, such as an access-system type, access time information, access-location information, an access-failure reason, the number of access failures, etc. The access-system type refers to information for identifying the cellular system to which access has been failed. In this case, the information indicating "the cellular system A". The access time information refers to the time information at the time (any one of: at determination start time, at determination completion time, or at any time during the determination processing) of determining that an access is not available. The access time information uses standard time obtained from a base station, local time information, or the number of clocks inside of the mobile communication terminal, and a counter value.

In this regard, for obtaining information from a base station in the case of an access failure, if a response indicating abnormal completion such as access unavailability, etc., is returned, that time information and the reason of the access failure should be stored as access-failure information. If some information is obtained in the case of an access failure, that information should be used. Even if that information cannot be obtained, it is at least possible to obtain time information from the clock inside of the mobile communication terminal.

The access-location information is the information on the location of the mobile communication terminal at the time of the determination of the access unavailability. The access-location information includes the latitude and longitude information by GPS and various types of ID and PN information for identifying the base station or a group of base stations to which an acquisition or an access is tried. In this regard, in order to obtain information from GPS, this equipment (mobile communication terminal) may connect to a location site to obtain the information. Also, a GPS circuit may be installed in the terminal.

The access-failure reason is the information indicating whether the reason for determining the access unavailability is, for example, an acquisition fail or no response to the access request. The number of access failures represents the number of the determinations of the access unavailability by consecutive access availability determinations or the total number of the determinations of the access unavailability in a predetermined time period.

After the access-failure information to the cellular system A is stored, a determination is made on whether cellular system B can be accessed (S308). This determination is the same as in S304. Here, if it is determined to be accessible, the communication with cellular system B is started (S310).

On the other hand, if it is determined not to be accessible, the access-failure information to cellular system B is stored in the storage section 203 (S311). The access-failure information is the same as that described in S307. After the access-failure information to cellular system B is stored, a determination is made on whether cellular system C can be accessed (S312). The determination is the same as that in S304 and S308. Here, if it is determined to be accessible, the communication to cellular system C is started (S314). On the other hand, if it is determined not to be accessible, an access failure occurs and the terminal enters an idle state (S316).

The basic sequence at access time is described above. A specific description will be given of the access-system determination processing in S303. As described above, here, the determination processing is performed on the basis of the access-failure information stored in the storage section 203 in S307 and S311. One example of the determination is that in a state where an access to a certain system has failed at a certain location previously, when the terminal tries to newly gain access in the vicinity of that location, that system is not tried to be accessed and another system is tried to be accessed.

A more specific description will be given. Assume that the access-failure information keeps the fact that an access to system A has failed previously at a certain location. First, "the location where an access has failed previously" is obtained from the access-location information in the access-failure information. At the same time, the current location is obtained from GPS or a base station. There are various kinds of information representing a location. For example, if a location is represented by latitude and longitude information, the distance between the two points is calculated. If that value is smaller than a predetermined value, the location is determined to be "in the vicinity". Also, for example, when the location is represented by the identification (base-station ID, PN number, etc.) of the base station covering that location, if the individual base-station identifications are the same, the location is determined to be "in the vicinity". Alternatively, the geographical information of a base station is obtained from the identification of the base station and a determination is made on whether "in the vicinity" or not from the distance between two points.

Here, in order to calculate geographical information of each base station from a base-station identification such as a base-station ID, a PN number, etc., the corresponding relationship information between the base-station identifications and the geographical information may be held in the storage section 203 in advance. Alternatively, the geographical information may be obtained from the network through the transmission/receiving section 201 and the modulation/demodulation section 202. In this manner, when system A is tried to be accessed in the vicinity of the location where an access has failed previously, it is assumed that an access to system A might fail in the same manner. Thus, system A is not accessed and the processing proceeds to the access operation to system B or to system C immediately (S308 and S312) Thus, it is possible to shorten re-acquisition time and to reduce power consumption.

Another example of the access-system determination processing in S303 is that in a state where an access to a certain system has failed previously, when the terminal tries to gain access within a predetermined time period, that system is not accessed and another system is accessed.

A more specific description will be given. Assume that the access-failure information keeps the time information when an access to system A has failed previously. A determination is made on whether or not a predetermined time period has passed by comparing "the time at which an access has failed previously" and "the current time". Here, a predetermined time period is held in the storage section 203 in advance or is obtained from a network through the transmission/receiving section 201 and the modulation/demodulation section 202.

In this manner, only within a predetermined time period after an access to system A has failed, it is assumed that the radio wave environment has not changed significantly so that an access failure to system A is highly probable in the same manner. Thus, system A is not accessed, and the processing proceeds to the access operation to system B or to system C immediately (S308 and S312). Thus, it is possible to shorten re-acquisition time and to reduce power consumption.

In the example other than the case described above, a determination may be made using both the location and the time of an access failure. Thus, it is possible to shorten re-acquisition time and to reduce power consumption.

Also, in the example described above, access-failure information may not be recorded when an access to a certain system has failed once. Access-failure information may be recorded when access failures occur for a predetermined number of times consecutively or when access failures occur more than a predetermined number of times within a predetermined time period. With reference to this, access-system determination processing in S303 may be performed. Thus, it is possible to shorten re-acquisition time and to reduce power consumption.

In this regard, the access-failure information recorded in S307 and S311 may be held until a delete operation is performed explicitly. Thus, it is possible to increase the effect in shortening re-acquisition time and reducing power consumption. An explicit deletion operation may include, for example, the case where the user operates the key-input section 205 in order to delete the access-failure information compulsorily and at the same time, may include the processing as follows. For example, the access-failure information may be deleted after the completion of the access-system determination processing in S303. Alternatively, the deletion may be performed when the communication is started with any one of the systems (S306, S310, and S314). Thus, it is possible to reduce the amount of the memory used for storing the access-failure information.

Also, access-failure information may be deleted when the terminal has moved away from the location of obtaining the access-failure information. Specifically, access-failure information may be deleted when the distance between the location where the access-failure information is obtained and the current location becomes a predetermined distance or more, or when the terminal moves to a service area of a base station having a base-station identification different from the base-station identification of the base station with which communication is performed when the access-failure information has been obtained. Thus, it is possible to reduce the amount of the memory used for storing the access-failure information.

Also, access-failure information may be deleted when a predetermined time period has passed after the access-failure information has been obtained. Thus, it is possible to reduce the amount of the memory used for storing the access-failure information.

While the present invention has been described with reference to the preferred embodiments, it is intended that the invention be not limited by any of the details of the description therein but includes all the embodiments which fall within the scope of the appended claims.

What is claimed is:

1. A multimode access control method in a multimode mobile station including a storing section and a controller being capable of communicating with a plurality of cellular systems, comprising:
a storing step for storing in the storing section access-failure information, including access-failure location information, at access failure time;
an access operation instruction step for instructing with the controller an access operation without changing a cellular system with which the mobile station is currently in an idle state;
a determination step for determining whether a current location of the mobile station is at or is near to a location where an access failure has previously occurred, based on a comparison of the current location of the mobile terminal with said stored access-failure location information;
a selection and access operation step for:
selecting with the controller, out of the plurality of cellular systems, an accessed cellular system, such that when the current location of the mobile station is determined, by said comparison at said determination step, to be at a location where an access failure has previously occurred, the accessed cellular system is not selected from one or more cellular systems of the plurality of cellular systems for which an access-failure has previously occurred at the current location of the mobile station, and
performing with the controller an access operation to the accessed cellular system including acquiring the accessed cellular system and starting communication with the accessed cellular system without changing the cellular system with which the mobile station is currently in an idle state; and
a deleting step for deleting the access-failure information when a distance between a location where the access-failure information stored by the storing step is obtained and a current location becomes a predetermined distance or more.

2. The multimode access control method according to claim 1, wherein the access-failure information includes any one of access-failure system information, access-failure time information, access-failure location information, access-failure reason, and the number of access-failures.

3. The multimode access control method according to claim 1, wherein the storing step stores access-failure information including access-failure system information and access-failure location information at access-failure time, and the selection and access operation step does not select an accessed cellular system indicated by the access-failure system information as an accessed cellular system in a location indicated by the access-failure location information.

4. The multimode access control method according to claim 1, wherein the storing step stores access-failure information including access-failure system information and access-failure time information at access-failure time, and the selection and access operation step does not select an accessed cellular system indicated by the access-failure system information as an accessed cellular system until a predetermined time period has passed from a time indicated by the access-failure time information.

5. The multimode access control method according to claim 1, wherein the storing step stores access-failure information including access-failure system information, access-failure location information, and access-failure time information at access-failure time, and
the selection and access operation step includes,
a first determination step of not selecting an accessed cellular system indicated by the access-failure system information as an accessed cellular system in a location indicated by the access-failure location information, and
a second determination step of not selecting an accessed cellular system indicated by the access-failure system information as an accessed cellular system until a predetermined time period has passed from a time indicated by the access-failure time information.

6. The multimode access control method according to claim 1, wherein the storing step stores access-failure information when an access failure occurs for a predetermined consecutive number of times.

7. The multimode access control method according to claim 1, wherein the storing step stores access-failure information when access failure occurs more than a predetermined number of times in a predetermined time period.

8. The multimode access control method according to claim 1, further comprising:

a holding step for holding the access-failure information stored by the storing step until an explicit deletion operation is performed.

9. The multimode access control method according to claim 1, further comprising:
a deleting step for deleting the access-failure information stored by the storing step when a predetermined time period has passed after the access-failure information is acquired.

10. A multimode mobile station capable of communicating with a plurality of cellular systems performing multimode mobile communication, comprising:
a storing means for storing access-failure information, including access-failure location information, at access failure time;
an access operation instruction means for instructing an access operation without changing a cellular system with which the mobile station is currently in an idle state;
a determination means for determining whether a current location of the mobile station is at or is near to a location where an access failure has previously occurred, based on a comparison of the current location of the mobile terminal with said stored access-failure location information;
a selection and access operation means for:
selecting, out of the plurality of cellular systems, an accessed cellular system, such that when the current location of the mobile station is determined, by said comparison by said determination means, to be at a location where an access failure has previously occurred, the accessed cellular system is not selected from one or more cellular systems of the plurality of cellular systems for which an access-failure has previously occurred at the current location of the mobile station, and
performing an access operation to the accessed cellular system including acquiring the accessed cellular system and starting communication with the accessed cellular system without changing the cellular system with which the mobile station is currently in an idle state and
a deleting means for deleting the access-failure information when a distance between a location where the access-failure information stored in the storing means is obtained and a current location becomes a predetermined distance or more.

11. The multimode mobile station according to claim 10, wherein the access-failure information includes any one of access-failure system information, access-failure time information, access-failure location information, access-failure reason, and the number of access failures.

12. The multimode mobile station according to claim 10, wherein the storing means stores access-failure information including access-failure system information and access-failure location information at access-failure time, and the selection and access operation means does not select an accessed cellular system indicated by the access-failure system information as an accessed cellular system in a location indicated by the access-failure location information.

13. The multimode mobile station according to claim 10, wherein the storing means stores access-failure information including access-failure system information and access-failure time information at access-failure time, and the selection and access operation means does not select an accessed cellular system indicated by the access-failure system information as an accessed cellular system until a predetermined time period has passed from a time indicated by the access-failure time information.

14. The multimode mobile station according to claim 10, wherein the storing means stores access-failure information including access-failure system information, access-failure location information, and access-failure time information at access-failure time, and
the selection and access operation means includes,
a first determination means which does not select an accessed cellular system indicated by the access-failure system information as an accessed cellular system in a location indicated by the access-failure location information, and
a second determination means which does not select an accessed cellular system indicated by the access-failure system information as an accessed cellular system until a predetermined time period has passed from a time indicated by the access-failure time information.

15. The multimode mobile station according to claim 10, wherein the storing means stores access-failure information when an access failure occurs for a predetermined consecutive number of times.

16. The multimode mobile station according to claim 10, wherein the storing means stores access-failure information when access failure occurs more than a predetermined number of times in a predetermined time period.

17. The multimode mobile station according to claim 10, further comprising:
a holding means for holding the access-failure information stored in the storing means until an explicit deletion operation is performed.

18. The multimode mobile station according to claim 10, further comprising:
a deleting means for deleting the access-failure information stored in the storing means when a predetermined time period has passed after the access-failure information is acquired.

* * * * *